United States Patent

Miller

[15] 3,650,248

[45] Mar. 21, 1972

[54] HEATING SYSTEM

[72] Inventor: Avy Lewis Miller, 4090 Valley Meadow Road, Encino, Calif. 91316

[22] Filed: June 8, 1970

[21] Appl. No.: 44,335

[52] U.S. Cl. ..................122/235 R, 122/328, 122/DIG. 1, 431/348
[51] Int. Cl. ..........................................F22b 21/04
[58] Field of Search..............122/235, 328, DIG. 1; 431/348

[56] References Cited

UNITED STATES PATENTS

| | | | |
|---|---|---|---|
| 2,000,376 | 5/1935 | Cargill et al. | 122/338 |
| 2,604,084 | 7/1952 | Sherman | 122/338 |
| 2,787,256 | 4/1957 | Ilune | 122/DIG. 1 |
| 2,070,859 | 2/1937 | Howe | 431/348 |
| 3,182,712 | 5/1965 | Zink et al. | 431/348 X |

*Primary Examiner*—Kenneth W. Sprague
*Attorney*—Donald E. Nist

[57] ABSTRACT

An improved compact heating system, particularly adapted for heating water and for steam generation, includes a combustible gas supply zone, a combustion chamber therearound in the form of a burner element comprising a refractory cup in heat exchange relation with an array of heat exchange elements spaced peripheral therefrom, and gas ignition means. The system is adapted to efficiently burn a high velocity stream of combustible gases and develop a wide range of B.t.u. outputs per hour, including multi-million B.t.u. outputs, while providing advantages of larger types of heating systems, including easy access for maintenance, repair, replacement and clean-up.

7 Claims, 2 Drawing Figures

PATENTED MAR 21 1972 3,650,248
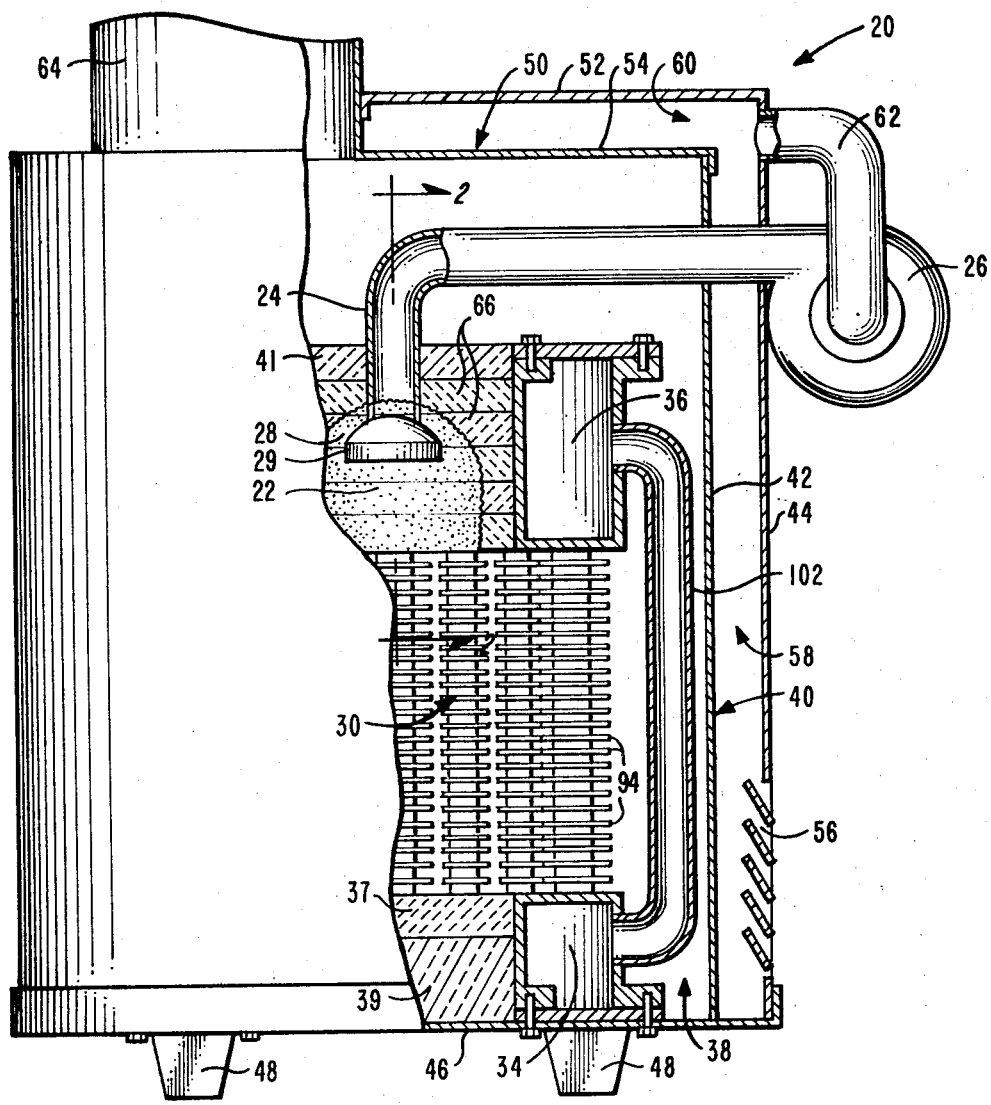
FIG.—1
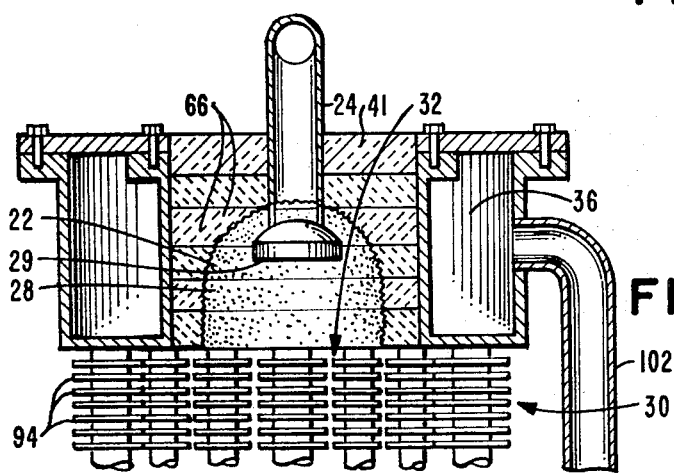
FIG.—2
INVENTOR.
AVY LEWIS MILLER
BY
Donald E. Nist
ATTORNEY

HEATING SYSTEM

BACKGROUND

1. Field of Invention

The present invention is directed to heating systems, particularly for heating water and generating steam.

2. Description of the Prior Art

Conventional water heating and steam generating systems are relatively bulky in relation to their B.t.u. output. Certain advanced types of such systems impel combustible and combusted gases therethrough at high velocity and, accordingly, can be made much smaller and more compact. However, there has been a practical limitation on how small such units can be and still be economical to make and efficient to operate so as to provide a suitable high B.t.u. output while retaining advantages of the larger types of heaters, including easy access for cleaning, repair, inspection and replacement of components. There has been a particular need for a new generation of more compact heaters which can be made inexpensively and which have the aforesaid advantages of the larger types of heaters.

SUMMARY OF THE INVENTION

The Abstract herein summarizes certain features of the invention. The described heating system, although particularly adapted as a water heating system, is also applicable to heating of other liquids and generating steam.

Such system is characterized, in part, by being extremely compact, and being capable of utilizing a high velocity stream of combustible gases to provide a very high B.t.u. output over a wide range. Blower means are provided to force combustible fluid into the combustion zone, and combusted gases past the heat exchanger elements and out of the system. The elements may be finned and with or without baffle elements. Return conduits may be disposed peripheral of the elements and interconnected therewith through headers to provide circulation for the heat transfer medium (water), particularly suitable where external pump means are not provided. Moreover the system provides easy access for cleaning and for inspection, maintenance, repair and replacement of heat exchanger tubes, etc.

DRAWINGS

FIG. 1 is a schematic side elevation of a preferred embodiment of the heating system of the invention, with portions broken away to show the internal construction thereof; and, FIG. 2 is an enlarged fragmentary section view of the heating system of FIG. 1.

DETAILED DESCRIPTION

The System in General

Now referring to the drawings, FIG. 1 schematically illustrates in side elevation, partly broken away, a preferred embodiment of the heating system of the invention. As shown in FIG. 1, a heater 20 is provided, which includes a central combustible fluid supply zone 22 to which is connected a combustible fluid supply duct 24 leading from a blower 26. Such fluid may be air or oxygen and either gas such as natural gas, propane or the like, or fuel oil, etc. Zone 22 is defined by a burner element 28, preferably generally cylindrical in configuration and cup shaped with a roughened inner surface 27 to improve gas mixing. Element 28 can include, if desired, a plurality of cups (not shown) in place of the single cup. A combustible fluid distributor is provided 29 connected to or separate from duct 24 and comprising means, such as a deflector, multi-apertured head of the like for distributing uniformly combustible gases or liquid around most of the base of the cup 28 so as to control the extent and distribution of the flame produced in cup 28. An array of heat exchanger elements 30 preferably surrounds element 28 and is spaced outwardly therefrom to provide therewith a heat exchange zone 32. Annular headers 34 and 36 interconnect elements 30 and are in turn connected to water supply means (not shown) through header 34 and hot water removal means (not shown) through header 36. Refractory (such as silica) layer 37 is disposed at the lower end of zone 32 between header 34 and is backed by a heat insulative layer 39 fabricated of mineral wool or the like, while element 28, itself of refractory material, is backed by a heat insulative layer 41. Accordingly, the hot area represented by element 28 and heat exchange zone 32 is surrounded by water filled elements 30 and headers 34 and 36 and the described thermal backing and is spaced inwardly of the remainder of system 20. In this regard, a space 38 is provided between elements 30 and an insulated jacket 40 comprising two spaced walls 42 and 44 connected at their lower ends to a base plate 46 (and on which layer 39 is disposed) resting on support legs 48 and connected at their upper end to a similarly constructed jacket 50 comprising walls 52 and 54. An air inlet 56 communicates with a passageway 58 between walls 42 and 44 and an interconnected passageway 60 between walls 52 and 54, those passageways in turn being connected to an inlet duct 62 leading to blower 26 disposed outside jackets 40 and 50. Combustion ignition means (not shown) are also provided. A gas outlet duct 64 is also provided, as shown in FIG. 1.

Jackets 40 and 50, base plate 46, legs 48, ducts 24, 62 and 64 and blower 26 can be fabricated of any suitable conventional materials such as steel, iron, etc., in a conventional manner. Blower 26 can be powered in any suitable manner. It delivers combustible gases (air or oxygen and natural gas, etc.) at a high velocity, for example, 0.27 cubic feet/second for a unit having a total contained volume of 5.4 cubic feet and capable of putting out 800,000 B.t.u./hr. Combustible liquid supply means (not shown) may also be provided.

Burner Element

Burner element 28 is more particularly illustrated in enlarged fragmentary view in FIG. 2. Element 28 is hollow, preferably generally cylindrical and cup-shaped. Such cup can, for example, comprise a plurality of stacked refractory blocks or discs 66. Alternatively, cup 28 can be fabricated of a single piece of any suitable refractory material such as cast silica, alumina or the like. It will be understood that although a hollow cylindrical configuration for cup 28 is most desired, with the array of heat exchanger elements spaced outwardly therefrom and entirely surrounding the same, hollow square, polygonal or other configurations for the receptacle will perform efficiently. Moreover, the array of heat exchanger elements need not entirely surround the receptacle, although such array is the most efficient and the most compact.

Air or oxygen supplied by blower 26 passes with propane or other combustible gas through duct 24 into zone 22, deflecting from head 29, and is ignited within cup 28. If oil or the like combustible liquid is used, a feed line can run to head 29 which can be provided with suitable apertures to distribute such oil as a plurality of thin streams, spray or droplets in cup 28. The resulting hot gases pass into intimate contact with elements 30 as they extend down zone 32 and then into space 38 and out of system 20.

Heat Exchanger Elements

Regarding the heat exchanger elements, such elements 30 are shown in FIGS. 1 and 2 as hollow tubular members containing fins 94 to increase the efficiency of heat exchange with combustion gases in zone 32 and passing therefrom.

It will be understood that, if desired, such array may be modified to include an inner circular array of spaced unfinned hollow tubular members backed by an outer circular array of more closely spaced finned hollow tubular members. Hot gases as they initially contact elements 30 usually are of the order of about 2,600° F. but decrease in temperature due to the heat exchange to preferably well below 1,000° F. e.g., 500° F. or the like. It will be understood that, if desired, elements 30 can, in addition to being finned, be baffled by appropriate means to increase heat exchange efficiency. The cooled gases preferably pass into space 38 and exit the system through outlet duct 64 at temperatures of the order about a few hundred degrees Fahrenheit.

Elements 30 can be fabricated of any suitable durable high temperature heat transfer material, such as copper, aluminum, iron, etc., as can their fins. Obviously, the material selected must be capable of withstanding the impingement of hot combustion gases over a long period of time while providing for efficient heat transfer. Resistance to corrosion by the combustion gases and also the heat transfer medium, such as water, passing therethrough is essential.

Return Conduits

As previously described, elements 30 are interconnected through headers 34 and 36 adjacent the bottom and top, respectively, of heater 20. A preferred arrangement of components is schematically illustrated in FIGS. 1 and 2 wherein return conduits 102 are shown spaced outwardly from the array of elements 30 but in the flow path of combustion gases after the latter pass by finned elements 30. Conduits 102 conduct a heat transfer medium, such as water, between headers 34 and 36 and can be fabricated of any suitable high temperature material such as that described for elements 30. With such an arrangement, the combustion gases, after cooling by heat exchange with elements 30, impinge on conduits 102 and heat the heat transfer medium therein to a lesser extent than that in elements 30.

Accordingly, thermal circulation of the heat transfer medium within elements 30 and conduits 102 can be readily established such that the medium, due to the temperature differential between that in elements 30 and that in conduits 102, flows up through elements 30, then through header 36 then down through conduits 102, then through header 34 and finally up again through elements 30. This thermal circulation system effectively channels any pockets of gas formed from the liquid medium, (steam from water) to the cooler headers where the steam is eliminated.

Heater System

It will be noted that positioning of the burner element 28 within and spaced from the array of heat exchanger elements 30 to form therewith the heat exchange zone 32 of controlled configuration increases heat transfer and combustion efficiency per unit volume so that with high flow through velocities for combustion gas and water or other heat transfer medium, multi-million B.t.u./hr. outputs are possible with the present small, light, compact units while still providing easy access to the tubes 30 through headers 34 and 36 for clean-up, inspection, repair, maintenance and replacement. For example, a water heating unit having the following dimensions and operated within the following parameters, can produce B.t.u./hr. efficiently:

IMPROVED HEATER

Burner Element
  Height - 8 inches
  O. D. - 7 inches
  I. D. - 5 inches (average)
  Construction material - ceramic refractory
Heat Exchanger Tube Array
  Spacing from burner element - eleven-sixteenths
  Number and spacing of tubes - 18 tubes spaced with 1/16-inch gaps
  O. D. of tube and length - 1 inch 21 inches
  I. D. of tube - seven-eighths inch
  Radius of fin - five-sixteenths inch, 7 fins per inch
  Construction material - copper
Heater Dimensions (O. D.) - 20 inches × 30 inches
Combustion Gas Flow Rate - 1,000 cu. ft. of natural gas/hour
Water Flow Rate - 100 gals./min.
B.t.u. Output - 800,000 B.t.u./hr.

The present improved heater is equally adaptable to water heating and steam generation. Also it is inexpensive to build, operate and maintain, can be run continuously over long periods of time on bottled gas, natural gas, propane or other combustible gas mixture or on liquid fuels, such as fuel oil, diesel fuel, etc. without clean-up or maintenance and, because of the high flow rate of water or other heat transfer medium therethrough, resists buildup of scale or corrosion of components. Moreover, the components thereof are few, durable and inexpensive and access thereto for clean-up, inspection, repair, maintenance and replacement is easy. The heater is ideal for such uses as pool heating and the like where space is at a premium. Because of its small size, it can be shipped assembled or in fewer sub-assembled components at less cost and can be installed and run at a lower than conventional price. Its components can be constructed of readily available materials in an inexpensive manner. Such heater fills a longfelt need for improved heating efficiency and compactness in the water heating and allied fields.

What is claimed is:

1. An improved compact heating system comprising, in combination:
   a. combustible fluid supply means;
   b. a combustion chamber comprising:
      1. a refractory burner element connected to said fluid supply means; and,
      2. combustion ignition means;
   c. a plurality of spaced heat exchange elements peripherally disposed around said burner element in an array in heat exchange relationship thereto to define a heat exchange zone;
   d. means for conducting a heat transfer medium into, through and out of said heat exchange elements;
   e. means for introducing combustible fluid to said fluid supply means;
   f. a heat insulative shield disposed around and positioned outwardly from said heat exchange elements to define therewith a collection space; and,
   g. means for exhausting combustion gases from said collection space.

2. The improved heating system of claim 1 wherein said shield is spaced from said combustion chamber and fluid supply means and wherein blower means are provided for impelling gases through said system at a high flow rate.

3. The improved heating system of claim 1 wherein said burner element is a generally cylindrical and hollow cup with said combustion fluid supply means disposed centrally therein, wherein said fluid supply means is adapted to supply combustible gases, and wherein said heat exchanger elements are disposed in a generally cylindrical array around substantially the entire periphery of said cup to enclose said heat exchange zone.

4. The improved heating system of claim 3 wherein said system employs hot water as a heat transfer medium within said heat exchanger elements and combustible gases as combustible matter to said combustion chamber, and wherein said cup comprises stacked refractory discs.

5. The improved heating system of claim 1 wherein said heat exchanger elements are vertically disposed and are interconnected through spaced upper and lower headers at opposite ends thereof, and wherein a plurality of water return conduits are disposed peripheral of and parallel to said heat exchanger elements and interconnected therewith through said headers, whereby steam entrainment in said heat exchanger elements is avoided.

6. The improved heating system of claim 4 wherein said cup is enclosed by the upper of said headers, wherein said cup is backed by thermally insulative material, and wherein said cup has a roughened inner gas-mixing surface, and wherein said lower header encloses thermally insulative material forming the base of said heat exchange zone.

7. The improved heating system of claim 6 wherein an air inlet duct is disposed in said outer heat insulative shield and communicates with said blower, wherein a gas exhaust duct is disposed through said shield at a point remote from said air inlet duct, and wherein said fluid supply means comprises a head connected to a gas supply duct, which head defines a plurality of orifices spaced to uniformly distribute combustible fluid along a substantial area of the base of said cup for uniform flame propagation.